March 8, 1960
R. G. BRUNER
2,927,616
VEGETABLE TOPPERS
Filed Nov. 1, 1957
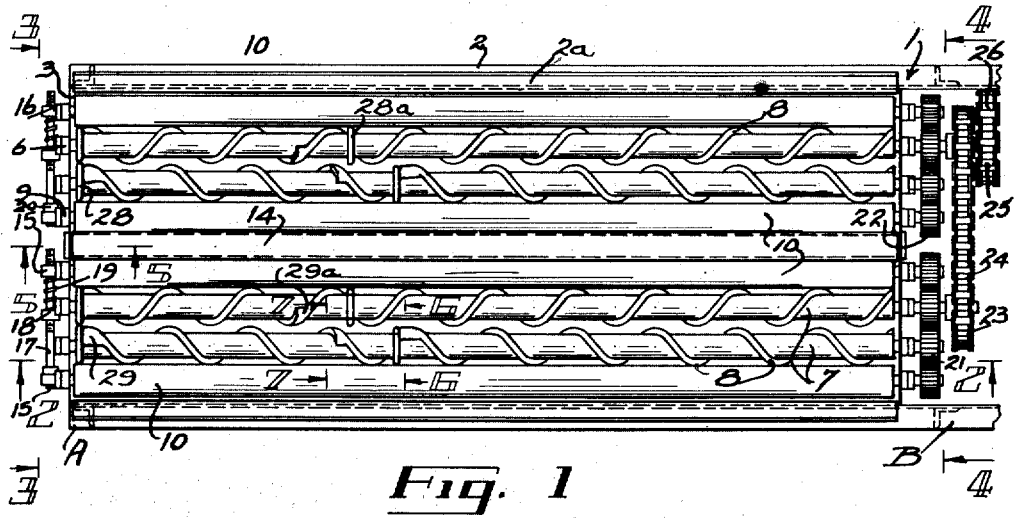
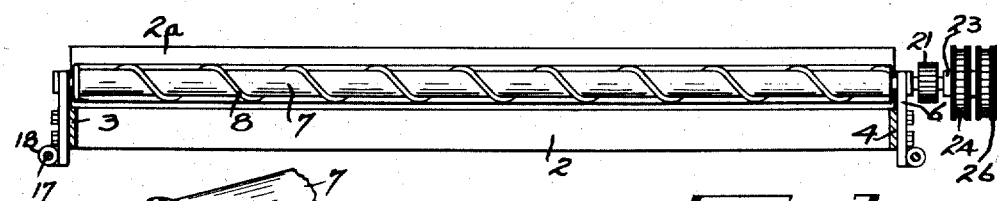
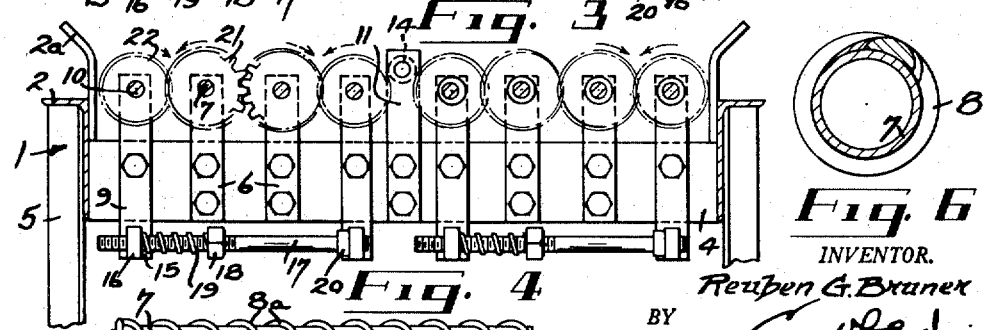
INVENTOR.
Reuben G. Bruner
BY
Attorney.

United States Patent Office 2,927,616
Patented Mar. 8, 1960

2,927,616
VEGETABLE TOPPERS
Reuben G. Bruner, Ferndale, Mich.

Application November 1, 1957, Serial No. 693,921

2 Claims. (Cl. 146—83)

This invention relates to improvements in vegetable toppers, and refers particularly to toppers for the removal of tops from such vegetables as carrots, onions, red beets and the like.

It is an object of the invention to provide a vegetable topper having a plurality of parallel rollers thereon onto which adjacent one extremity vegetables are adapted to be deposited; to arrange the rollers in mating, or coacting pairs from one of each of which a helical rib projects while the other is smooth, so that as the rollers are rotated the tops of the vegetables are drawn between the mating pairs and pinched off; meanwhile additional means are also provided adjacent the discharge end of each pair of rollers for severing the tops from the vegetables.

Another object of the invention is to provide such a vegetable topper including additional means mounted intermediately of the length of the topper on one of each coacting pairs of rollers for severing the tops from the vegetables.

Yet another object of the invention is to provide such a vegetable topper wherein the ribbed and smooth roller of each mating pair turn at somewhat different speeds so that a slight scrubbing action is obtained to increase the speed of severance of the tops and thus the output of the machine. Moreover this quicker removal of the tops obviates damage which often occurs if a prolonged tearing action is employed, such as that which frequently results when mating rollers operate at the same speed. Again by rotating the rollers of each mating pair at different speeds formation by the helical ribs of grooves in the smooth rollers is prevented.

With these and other objects and advantages in view which will become apparent as the specification proceeds, the invention is more fully described with the aid of the accompanying drawing, in which:

Figure 1 is a plan view of the invention.
Figure 2 is a section on the line 2—2 of Figure 1.
Figure 3 is an end view on the line 3—3 of Figure 1.
Figure 4 is a section on the line 4—4 of Figure 1.
Figure 5 is a detail.
Figures 6 and 7 are enlarged views; the former being a section on the line 6—6 of Figure 1, and the latter being a perspective view taken substantially on the line 7—7 of Figure 1.
Figure 8 is a partial view of a ribbed roller having double pitch ribs thereon.

Referring to the drawing, 1 designates a rigid rectangular frame having parallel sides 2 suitably secured to one another at their front and rear extremities A and B by front and rear transverse members 3 and 4, respectively. The frame 1 is, in the present instance, supported by legs 5 which are secured to the sides 2, and projecting at an upward and outward inclination from and above the sides 2 are guard rails 2a.

Rigidly secured to and projecting upwardly from the transverse members 3 and 4, and arranged in longitudinally opposed pairs, are bearings 6 which support opposite extremities of rollers 7, so that the latter are parallel with one another and with the sides 2 of the frame between which they are arranged. Helical ribs 8 are formed around the rollers 7 to project from the peripheries of the latter. While the ribs are usually wound in a single pitch as shown at 8, double pitch ribs 8a, as shown in Figure 8, may also be employed if desired. Pivotally mounted upon and projecting upwardly from the transverse members 3 and 4 are other bearings 9 arranged in longitudinally opposed pairs to support opposite extremities of smooth rollers 10 which are thus mounted for movement at right angles to the axes of the ribbed rollers 7.

The rollers 7 and 10 are arranged in coacting sets of four in the frame 1. In the present instance two such sets are provided though it is of course understood that wider toppers having correspondingly more sets of rollers therein may be made if desired; however in every case each set includes two smooth outer rollers 10 between which two rollers 7 are provided having helical or spiral ribs 8 thereon. As the spacing between outside rollers 10 of the different sets is quite appreciable it is necessary to provide means for preventing vegetables dropping between them, for guiding the vegetables towards the ribbed rollers 7 by which they are moved longitudinally along the topper, and for preventing adjacent pairs of smooth rollers 10, by their upward and inward movement, imparting a spinning movement to vegetables between them. This is done in the present instance by securing vertical supports 11 on the front and rear transverse members 3 and 4, and inserting pins 12 through the supports to engage opposite extremities of a tubular divider 14 which lies between and parallel with adjacent rollers 10.

The ribbed rollers 7 are preferably of uniform diameter throughout their length, whereas the diameter of the smooth rollers 10 gradually increases from their opposite extremities to a point centrally of their length. In the case of sixty inch rollers an increase in diameter of about twenty-five thousandths of an inch at their centers effectively maintains a uniform pressure against vegetable tops between coacting pairs of rollers 7 and 10 throughout their length, and satisfactorily offsets any tendency for the smooth rollers to spring away from the ribbed ones. From exhaustive field tests it has been found that a helical rib 8 wound substantially nine times around a roller 7 sixty inches in length provides the necessary pitch for imparting both a gentle cutting action and high conveying speed to the vegetables without undue roller speed.

Projecting downwardly from the pivoted bearings 9 for each set of smooth rollers 10 are arms 15 forwardly from which lugs 16 projects. Extending through each pair of lugs 16 is a pin 17 which is threaded from one extremity for a portion of its length. In engagement with the threaded portion of the pin 17 between the lugs 16 is a nut 18, and mounted around the threaded portion of the pin between one of the lugs 16 and the nut 18 is a helical spring 19. Secured around the pin 17 and bearing against the inner face of the other lug is a collar 20. Thus the spring 19 tends to force the lugs 16 apart thereby turning the bearings 9 about their pivot axes and forcing the smooth rollers 10 toward one another and into engagement with the ribbed rollers 7 with which they cooperate.

Secured on the rear extremities of the rollers 7 and 10 of each set are meshing gears 21 and 22, respectively. The gears 21 and 22 preferably have eleven and ten teeth respectively. Thus the ribbed rollers rotate slower than the smooth ones and consequently the wear of the ribs 8 is uniformly distributed over the peripheral faces of the smooth rollers with which they cooperate; whereas if all the gears of a set were the same size the ribs 8 would bear constantly against the same portions of the smooth rollers and soon wear helical grooves therein. Again, the ribbed rollers and their mating smooth rollers are not exactly the same diameter as the most desirable scrub or shearing action is obtained if the smooth rollers are somewhat smaller in diameter, usually about one sixteenth of an inch smaller, than their mating ribbed rollers. Mounted on the rear extremity of one ribbed roller 7 of each set is a sprocket 23, and extending around both the latter is a chain 24. Another sprocket 25 is also secured on one roller, preferably one of the rollers 7 having a sprocket 23 thereon, and suitable means are provided for turning the sprocket 25 by a chain 26 driven by any preferred means—not shown.

Secured around the front extremities of the ribbed rollers 7 are rings 28 against which the front extremities of the ribs 8 terminate. The circumference of the rings is substantially the same as that of the ribs. Secured to the peripheries of the rollers 7 immediately adjacent and between the junction of the rings 28 with the ribs 8 are shearing members 29. These members extend circularly forward in front of the ribs 8 and radially outward from the circumference of the rollers 7 to form shearing faces between which and the opposed smooth rollers 10 additional cutting action is provided for. As the rollers turn they feed vegetables deposited thereon towards the front of the topper, meanwhile tops of vegetables drawn between pairs of coacting rollers 7 and 10 are pinched off and the vegetables are delivered over the front transverse member 3 onto any preferred form of discharge mechanism—not shown. If some juicy, immature tops are not completely severed from the vegetables they hang between the rollers and eventually over the front transverse member 3, thereby interfering with the proper operation of the machine. Therefore to further increase efficiency and provide for more uniform severance of the tops during the travel of the vegetables along the rollers either other rings 28a or shearing members 29a, or both, similar to the rings 28 and members 29, may be mounted on the rollers 7 intermediately of their length. Though in this case the rings 28a, if employed, are preferably split to provide for passage of the helical ribs 8. Thus the rings and shearing members form auxiliary means on the rollers for engaging and pinching off the tops.

While in the foregoing the preferred embodiment of the invention has been described and shown, it is understood that alterations and modifications may be made thereto, provided the said alterations and modifications fall within the scope of the appended claims.

What I claim is:

1. A vegetable topper comprising a frame having a plurality of substantially horizontal, parallel rollers mounted thereon, said rollers being in transverse alignment and arranged in sets, means separating the adjacent rollers of adjacent sets, each set including two adjacent rollers having helical ribs wound in opposite directions thereon and a smooth roller outwardly of each ribbed roller for coaction therewith, means for rotating each alternate roller in one direction and the other rollers in the opposite direction including means for turning the smooth rollers somewhat faster than the ribbed rollers, the pitch of the ribs being such that vegetables are adapted to lie against the rollers and be advanced by said ribs along paths substantially parallel with the rollers, the peripheries of the smooth rollers being longitudinally slightly convex, each coacting pair of ribbed and smooth rollers being adapted to draw the tops of vegetables upon them down between the pair whereby some of the tops are pinched off between the coacting rollers, and auxiliary means on the ribbed rollers for pinching off other tops between them and the smooth rollers with which they cooperate.

2. A vegetable topper comprising a frame having a plurality of horizontal and substantially parallel rollers concentrically mounted thereon, said rollers being in transverse alignment and including two adjacent rollers having helical ribs thereon wound in opposite directions and a smooth roller outwardly positioned adjacent each ribbed roller for coaction therewith, means for rotating each alternate roller in one direction and the other rollers in the opposite direction, each coacting pair of ribbed and plain rollers being so rotated that their coacting peripheral faces turn downwardly and are adapted to draw the tops of vegetables on the rollers between them and pinch some of them off, rings secured around the ribbed rollers at right angles to the roller axes, said rings being substantially the same outside diameter as the ribs whereby other tops being carried along between the rollers by the ribs are adapted to be pinched off from the vegetables opposite the junctions of the rings with the ribs by the smooth rollers, the pitch of the ribs being such that vegetables are adapted to rest upon the peripheries of the ribbed rollers for transmission substantially parallel with the axes of the rollers by said ribs, and shearing members projecting from the peripheries of the ribbed rollers contiguous to the rings adapted to move the tops of the vegetables between coacting pairs of rollers into shearing engagement between said rollers.

References Cited in the file of this patent

UNITED STATES PATENTS

| | | |
|---|---|---|
| 746,704 | Hovey | Dec. 15, 1903 |
| 1,041,595 | Clemens | Oct. 15, 1912 |
| 2,418,700 | Davies | Apr. 8, 1947 |

FOREIGN PATENTS

| | | |
|---|---|---|
| 742,083 | France | Dec. 21, 1932 |